United States Patent
Wolf

[15] 3,701,205
[45] Oct. 31, 1972

[54] RESPONSIVE ANSWER SYSTEM
[72] Inventor: Stanley Wolf, Pleasantville, N.Y.
[73] Assignee: Docent Corporation, Pleasantville, N.Y.
[22] Filed: Sept. 27, 1971
[21] Appl. No.: 184,033

[52] U.S. Cl. ................................................35/9 G
[51] Int. Cl. ...........................................G09b 3/02
[58] Field of Search .........................................35/9 F

[56] References Cited

UNITED STATES PATENTS

| | | | |
|---|---|---|---|
| 1,884,197 | 10/1932 | Peterson et al. | 35/9 G |
| 3,363,336 | 1/1968 | Skinner | 35/9 G X |
| 3,516,177 | 6/1970 | Skinner | 35/9 G |
| 3,650,046 | 3/1972 | Skinner | 35/9 G |

*Primary Examiner*—Wm. H. Grieb
*Attorney*—John A. Howson

[57] ABSTRACT

A teaching device including a work sheet on which are visibly printed one or more outlined response areas in which a student is expected to write his answer to questions put to him. In addition, two or more feedback areas are visibly outlined on the same or a separate work sheet corresponding to each outlined response area. In a predetermined one of the feedback areas the correct answer is printed as an invisible image. The student writes his answer with a bullet point marker containing a chemical which makes the response visible. Writing the response also develops and makes visible segments of certain preprinted symbols or markings in the response area which identify to the student which feedback area contains the invisibly printed correct answer. The student may thereafter develop the invisible image in the identified feedback area to confirm the correctness of his own response. The latent symbols in the response area are randomly spaced to maximize the chance of being developed when any answer is written but to minimize the chance of being developed by only a few inconspicuous dots of the marking device in an attempt to cheat.

11 Claims, 4 Drawing Figures

RESPONSIVE ANSWER SYSTEM

BACKGROUND OF THE INVENTION

The invention relates to a learning device of the responsive answer type and more particularly to a cheat-proof, instant feedback learning device.

Several types of responsive answer systems which involve printing an invisible image that can be developed by a marker containing a chemical have been suggested. One of the most recent of such systems utilizes a work sheet on which are visibly printed multiple choice questions and a plurality of possible answers. Beside each answer is a box in which the student is expected to make a mark if he chooses that answer. One of the boxes contains an invisible ink symbol to be developed by the student in marking his answer, which indicates whether or not the student has chosen the correct answer. The symbol is randomly located in the box to discourage the student from cheating by developing the latent symbol with inconspicuous dots. The same technique is applied to true-false type answers and questions.

Such a system is limited in its application. It is not applicable where the student is expected to write his answer in the from of a word or number in the outlined answer area but is limited to answers in the form of a mark. A further disadvantage is that the printed visible answers from which the student is expected to make his choice may suggest the correct answer to the student.

SUMMARY OF THE INVENTION

The invention comprises a work sheet on which one or more response areas are visibly outlined. The student is expected to write a visible answer to the question put to him by writing it in the response area with an instrument whose writing tip contains a latent image developing chemical. For each response area there are two or more outlined feedback areas on the same sheet or on a supplementary sheet, in one of which the correct answer is printed as an invisible latent image.

The writing of the student's answer in the outlined response area also automatically makes visible segments of certain latent symbols or markings which have been printed in the response area and which indicate to the student which of the feedback areas contains the correct answer. He may then develop the correct answer in the select feedback response area by marking it with an appropriate developing chemical. Once the correct answer has been developed a glance at the answer written by the student in the response area will show the student whether his answer is correct or not. Since the correct answer was developed by the student after he wrote his response any attempt to cheat will be easily detected by the instructor who can see whatever additional marks are made on the paper.

In one preferred embodiment the latent markings within the response area are identical to a marking printed adjacent the feedback area containing the correct answer. Other, different symbols are visibly printed adjacent the remaining feedback areas. The correspondence between the developed segments of the markings within the response area and the marking adjacent the feedback area containing the correct answer provides the student with the key to which of the feedback areas contains the correct answer.

In another preferred embodiment a plurality of spaced-apart, distinct symbols are visibly printed adjacent the response area. Each symbol corresponds to one of the symbols visibly printed adjacent the separate feedback areas. The invisible latent markings within the response area are physically aligned with the select printed symbol adjacent the response area which corresponds to the symbol adjacent the feedback area containing the correct answer. When the markings are developed by the student in writing his answer the alignment of the markings with the select symbol and the correspondence between the select symbol and the symbol adjacent the latent image answer provide the location answer index.

In still another embodiment the outlined feedback areas are printed adjacent to the outlined response area. The latent markings within the response area are aligned with the feedback area containing the invisibly printed correct answer. When developed, by the writing of an answer, the markings themselves constitute the location index to the latent image correct answer.

The markings within the response area can be randomly dispersed in a quantity such as to maximize the chance of being developed when any answer is written but to minimize the chance of being developed through the placement of only a few inconspicuous dots in an attempt to cheat.

It is thus an object of the present invention to provide a responsive answer learning device with an invisible ink answer indicator.

It is a further object of the present invention to provide a responsive answer learning system which minimizes the opportunity for the student using the system to cheat.

It is still another object of the present invention to provide a responsive answer learning device of the invisible image type wherein the student is required to develop a clue for the location of the feedback information, that is the correct answer, by committing himself to first writing an answer.

The following and other objectives, features, and advantages of the invention will be more readily understood upon consideration of the following detailed description of a preferred embodiment of the invention, taken in conjunction with the accompanying drawings.

DESCRIPTION OF A PREFERRED EMBODIMENT

Figure 1:
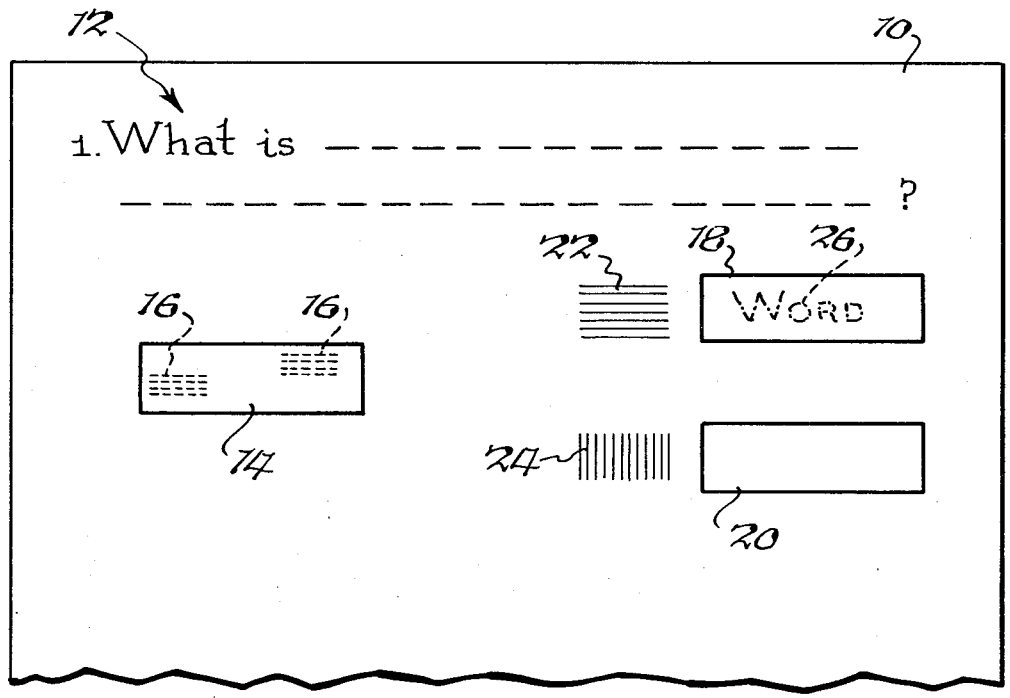
FIG. 1 is a schematic illustration of a portion of a work sheet having a single question, a single outlined response area corresponding to the question and two outlined feedback areas each adjacent a separate visible marking.

Referring now more particularly to FIG. 1 there is schematically illustrated a portion of an answer sheet 10 on which a question 12 is visibly printed. Beneath the question 12 is visibly outlined response area 14. Invisibly printed within the outlined response area 14 are latent markings 16 shown in dotted line fashion in FIG. 1 for purposes of illustration.

Figure 2:
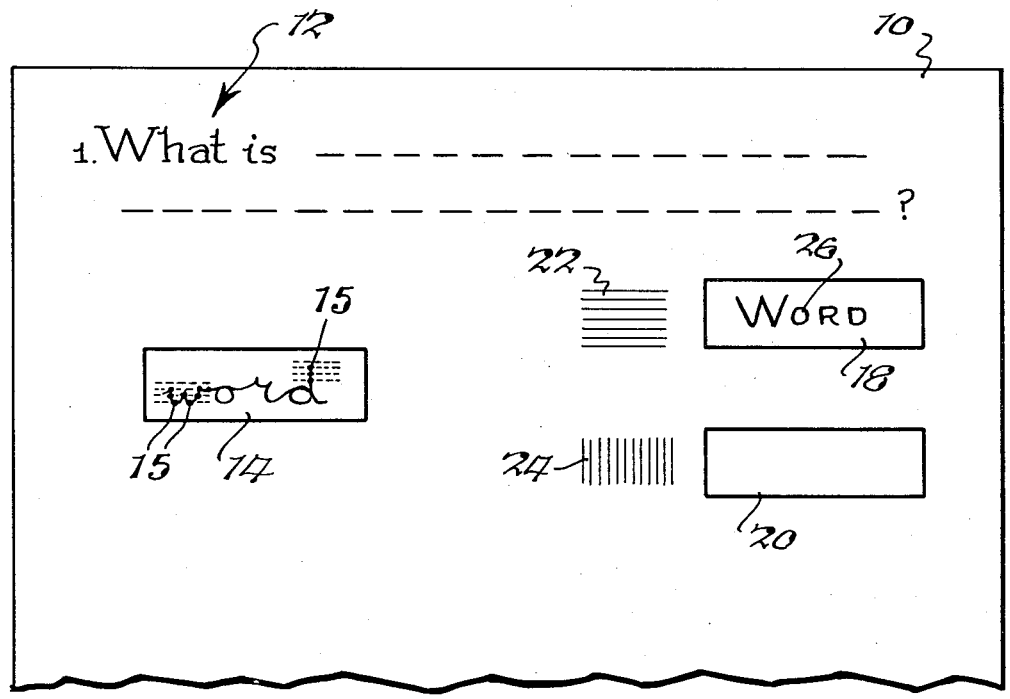
FIG. 2 is a schematic illustration of the portion of the work sheet shown in FIG. 1 after a response has been marked and the correct answer developed.

The invisible ink of the latent markings 16 remains invisible until a developing chemical is scribed over the response area by the student in writing his answer in the form of a number, letter, word, or in some other substantially continuous pattern with a pen containing an appropriate developing chemical. The reaction of the chemical with the invisible ink is such as to develop segments 15 of the latent markings 16 wherever the student's answer passes over the markings 16. The developed segments 15 are visible as illustrated in FIG. 2. In addition the response written by the student is also visible. This is accomplished either by mixing a visible dye with the developed chemical so that it can be seen, or by preprinting the entire response area with a second invisible ink. In either embodiment writing in the area with the developing chemical causes the word written to be visible in one color and segments of the invisibly printed symbols to be visible in another color.

On the same sheet are two visibly printed, outlined feedback areas 18 and 20 corresponding to the question 12. Adjacent the feedback area 18 is visibly printed index symbol 22 which identifies the feedback area 18. Adjacent the feedback area 20 is a visibly printed index symbol 24 which is distinguishable from the symbol 22 and which identifies the feedback area 20.

Having developed the segments 15 of the latent markings 16 in the response area 14 by writing his answer the student is referred to one of the two feedback areas by comparing the developed segments 15 with the visible index feedback symbols 22 and 24. The student has been previously instructed that the correct answer is invisibly printed in the feedback area indexed by the symbol which corresponds to the developed segments of the markings. For purposes of illustration the latent markings 16 correspond to the visible symbol 22 in the example shown in FIG. 1. The student may then develop a latent image 26, shown in hidden line fashion for purposes of illustration in FIG. 1, invisibly printed in the feedback area 18 corresponding to the correct answer to the question.

The latent image 26 is developed, as illustrated in FIG. 2, by an appropriate developing chemical. In most embodiments the developing chemical is the same mixture that the student used to write his response. In all embodiments the feedback area developing chemical produces a visible mark when it contacts either feedback area. This makes it apparent to the grader whether the student attempted to develop the wrong feedback area in order to cheat. Thus with two feedback areas if the student attempts to develop the correct answer before writing his own answer he has only a fifty percent chance of being correct, and if wrong, his attempt to cheat will be obvious. In embodiments with more feedback areas, the student's chances of successfully cheating are naturally even less than fifty percent.

One advantage of the present invention is that in order to cheat without simply gambling on which feedback area contains the correct answer the student must first develop segments of the latent markings 16 in the response area by making inconspicuous dots or some other discontinuous pattern with the writing chemical. He can then develop the latent correct answer 26 to enable him to write his own correct answer in the response area 14 in such a manner as to incorporate his inconspicuous cheating dots. By randomly dispersing the markings 16 in the response area 14 of the discontinuous pattern or dot method of cheating is made extremely difficult and time consuming for the student and thus the student is discouraged from such wayward pastimes.

Figure 3:
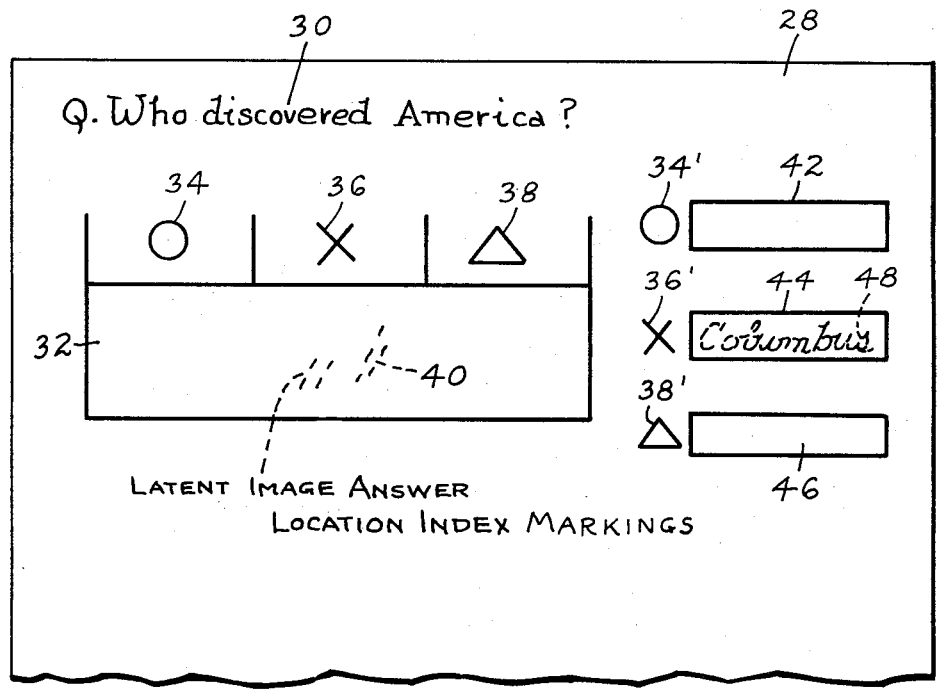
FIG. 3 is a schematic illustration of a portion of a question and answer work sheet according to a second embodiment of the invention.

Referring now more particularly to FIG. 3 another embodiment of the invention is schematically illustrated as comprising a portion of an answer sheet 28 on which a question 30 is visibly printed. Beneath the question 30 is a visibly outlined response area 32. Above and adjacent to the outlined response area 32 are three symbols, 34, an "X" 36 and a triangle 38. The symbols 34, 36 and 38 are spaced apart from each other. A plurality of latent image answer location index markings 40, shown in hidden line fashion in FIG. 3 for purposes of illustration, are invisibly printed within the outlined response area 32.

The student answers the question 30 by writing his answer in the outlined response area 32 with a developing chemical which produces a visible mark where it contacts the paper. As in the embodiment of FIG. 1, the chemical may be mixed with a visible dye or the portion of the work sheet within the response area may be treated to react with it to produce a distinct color. The reaction of the developing chemical wherever it contacts the invisible ink is such as to produce segments of the latent markings 40 in a visible color which is distinct from the color of the students's written answer.

On the same sheet and adjacent to the outlined response area 32 are three visibly printed, outlined feedback areas 42, 44 and 46. A correct answer 48 to the question 30 is invisibly printed within the feedback area 44. Adjacent the outlined response area 42 a circle 34' is visibly printed corresponding to the symbol 34. Adjacent the outlined feedback area 44 an "X" symbol 36' is visibly printed corresponding to the symbol 36. Adjacent the outlined feedback area 46 a triangle symbol 38' is visibly printed corresponding to the symbol 38.

Having developed segments of the latent markings 40 by writing his answer the student identifies the outlined feedback area containing the correct answer to the question 30 by noting that the developed markings 40 are aligned beneath the symbol 36 and that the symbol 36 corresponds to the symbol 36' adjacent to the visibly outlined feedback area 44. The student then develops the latent answer 48 within the outlined response area 44 by applying the developing chemical which he used to write his answer.

Figure 4:
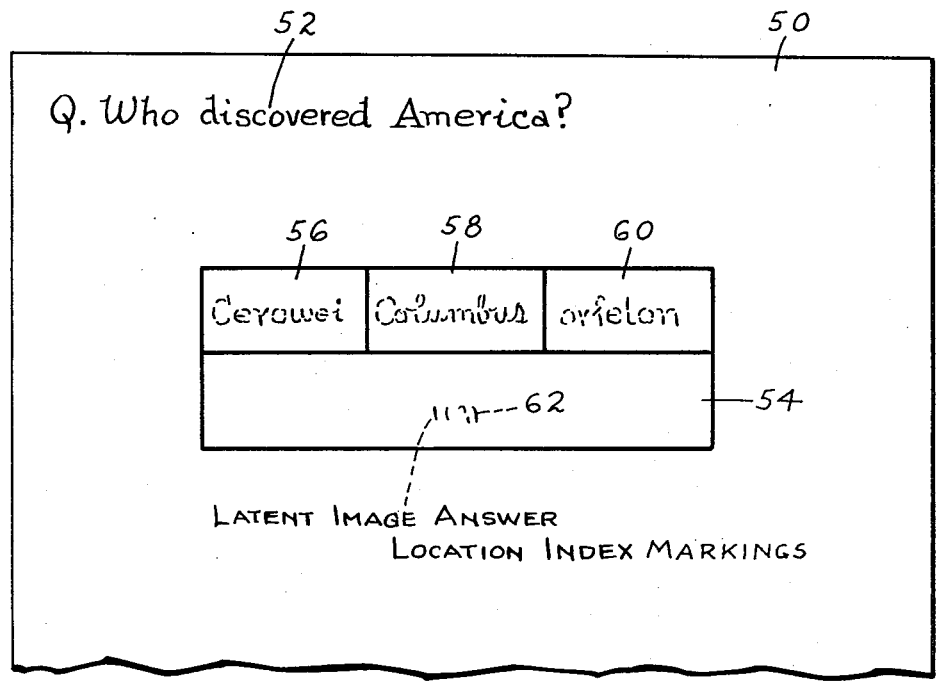
FIG. 4 is a schematic illustration of a portion of a question and answer work sheet according to a third embodiment of the invention.

A variation of the embodiment of FIG. 3 is illustrated in FIG. 4 as comprising a portion of an answer sheet 50 on which a question 52 is visibly printed. Beneath the question 52 is a visibly outlined response area 54 within which the student is expected to write his answer with the marker containing a developing chemical. Above the outlined response area 54 are three visibly outlined feedback areas or answer boxes 56, 58 and 60. Within the answer boxes 56 and 60 separate words are printed with invisible ink. The words as illustrated in FIG. 4 are nonsense words, however, in other embodiments they may be proper words. The purpose of these invisibly printed words is to prevent the student from cheating by attempting to develop a portion of the correct answer before he marks his own answer in the response area 54.

The correct answer to the question 52 is printed with invisible ink within the answer box 58. A plurality of latent image answer location index markings 62 are printed with invisible ink within the response area 54 and aligned directly beneath the answer box 58. When the student writes his answer with the developing chemical as described in the above embodiments portions of the latent markings 62 are developed and the student may thereby identify the answer box 58 directly above the developed markings 62 as containing the invisible image of the correct answer. The student can check his own response by developing the correct answer in the box 58 and comparing it with his own answer.

In other embodiments the latent markings 62, when developed, indicate the location of the answer box containing the correct answer by being angularly oriented toward the box. For example the latent markings in one embodiment may be a group of parallel dotted lines pointing to the correct answer box. Similarly the latent markings in another embodiment could be a group of dots forming a "V" with the point of the "V" directed toward the correct latent image answer.

As in the embodiment of FIGS. 1 and 2 the latent markings 40 and 62 are randomly dispersed within the respective response areas 32 and 54 so that the discontinuous pattern or dot method of cheating described above is made extremely difficult and yet the probability of disclosure of the markings upon ordinary, continuous writing is maximized.

An advantage of all of the embodiments of the present invention is that until a response is written there are no possible answers on the answer sheet to suggest the correct answer to the student. A second advantage is that there is some discretion left to the exam grader in that partial credit may be given to a student who writes an answer in the response area which is similar to the correct answer although not identical. In many prior systems of the invisible marking type such discretion is not possible because of the strictly mechanical aspects of the systems which require that the student's answer be identical with the correct answer.

While in the above described embodiments the work sheet is described as having one or more questions visibly printed thereon it is within the spirit and scope of the invention to present the questions to the students orally, on a blackboard, or by some other means separate from the work sheet.

The terms and expressions which have been employed herein are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. An improved responsive answer learning device of the type wherein a student is instructed to scribe his answer on a work sheet in response to a given question with a marker containing a special developing chemical which simultaneously makes a visible trace on the work sheet and reacts with markings printed with invisible ink on the work sheet to render them visible wherein the improvement comprises a work sheet having a first portion on which is printed at least one outlined response area for the student's answer and at least a first marking printed with invisible ink within the outlined response area in a pattern such that the student writes over and develops at least part of the first marking in writing his answer, a writing surface, the writing surface having a first and a second feedback areas outlined thereon and a latent image of the correct answer to the question put to the student printed with invisible ink within the first feedback area, the first marking having a predetermined relationship with the first feedback area such that the part of the first marking developed by the student's written response identifies the first feedback area to the student as the location of the latent image of the correct answer, whereby the student may thereafter compare his response with the correct answer by applying the developing chemical to the first feedback area to render the latent image printed thereon visible.

2. An improved responsive answer learning device as recited in claim 1 comprising a work sheet having one or more questions visibly printed thereon.

3. An improved responsive answer learning device as recited in claim 1 wherein the writing surface comprises a second portion of the work sheet.

4. An improved responsive answer learning device as recited in claim 1 comprising a work sheet on which a plurality of markings corresponding to the first marking are printed with invisible ink within the outlined response area, the markings being distributed throughout the response area in a pattern which maximizes the chance of being developed by the student's application of the developing chemical in any continuous pattern but minimizes the chance of being developed by the student's application of the developing chemical in a substantially discontinuous pattern.

5. An improved responsive answer learning device as recited in claim 1 comprising a first index symbol visibly printed on the writing surface which identifies the first feedback area, the first visible index symbol being consistent with the developed part of the first marking, and a second index symbol visibly printed on the writing surface which identifies the second feedback area, the second visible index symbol being distinct from the first visible index symbol.

6. An improved responsive answer learning device as recited in claim 1 wherein the first and second outlined feedback areas are printed on the work sheet adjacent to the outlined response area and the first marking is aligned with the first feedback area.

7. An improved responsive answer learning device as recited in claim 1 comprising a first index symbol visibly printed both on the writing surface adjacent to the first feedback area and again on the work sheet adjacent to the outlined response area and in alignment with the first marking, a second index symbol visibly printed both on the writing surface adjacent to the second feedback area and again on the work sheet adjacent to the outlined response area and spaced apart from the first index symbol, whereby when the student automatically develops parts of the first marking in writing his answer the first index symbol is identified to him by its alignment with the first marking as an index to the location of the invisibly printed correct answer.

8. A responsive answer learning device for students comprising, in combination, a work sheet, an outlined area on the work sheet for marking a response to a first question put to the student, at least a first marking invisibly printed on a portion of the work sheet within the outlined response area which is substantially certain to be marked over by the student in writing his answer, a writing surface having a first and a second outlined feedback areas printed thereon, the first feedback area having a latent image of the correct answer to the question put to the student printed with invisible ink therein, means for writing the student's response in a visible manner on the work sheet with a developing chemical which simultaneously makes visible the first marking in part wherever it is contacted by the developing chemical, the parts of the first marking when developed providing an identification to the student of the first outlined feedback area as the feedback area containing the correct answer, and means for making a visible mark on the writing surface while simultaneously developing the correct answer.

9. A responsive answer learning device for students comprising, in combination, a work sheet, at least one outlined area visibly printed on the work sheet to receive the student's written response corresponding to a first question put to the student, at least a first and a second outlined feedback areas visibly printed on the work sheet, a correct answer to the question put to the student printed with invisible ink within the first feedback area, the correct answer being capable of being developed by the application of an appropriate developing chemical to the first outlined feedback area, a visible first symbol visibly printed on the work sheet for identifying the first feedback area, a visible second symbol visibly printed on the work sheet for identifying the second feedback area, at least a third symbol printed with invisible ink on a portion of the work sheet within the outlined response area, the invisible third symbol being capable of being developed wherever it is contacted by an appropriate developing chemical which is applied to the portion of the work sheet by the student in writing his answer, the third symbol when developed at least in part having a predetermined physical relationship to the first symbol so that the first symbol is identified to the student as the key to the location of the invisibly printed correct answer which may thereafter be developed by the student to check his own response.

10. A responsive answer learning device as recited in claim 9 further comprising a fourth symbol and a fifth symbol both visibly printed on the work sheet adjacent to the outlined response area, the fourth symbol being consistent with the first symbol and the fifth symbol being consistent with the second symbol, the fourth symbol being aligned with respect to the third symbol so that the fourth symbol is identified to the student as an index to the location of the correct answer when portions of the third symbol are developed by the student in writing his answer with the appropriate developing chemical.

11. A method of responsive testing comprising the steps of:
 a. writing an answer in an outlined area on a work sheet to a given question with a developing chemical which simultaneously makes a visible mark and develops portions of a latent symbol invisibly printed in the outlined area, and thereafter
 b. applying an appropriate developing chemical to a select one of a plurality of feedback areas printed on a writing surface to simultaneously make a visible mark and to develop a correct answer printed with invisible ink in the select feedback area, the select feedback area being identified by the portions of the latent symbol within the outlined area which were developed in writing the answer.

* * * * *